(12) United States Patent
Kataoka et al.

(10) Patent No.: US 8,854,950 B2
(45) Date of Patent: Oct. 7, 2014

(54) TRANSMISSION SYSTEM, TRANSMISSION METHOD, AND COMMUNICATION DEVICE

(75) Inventors: Hiroaki Kataoka, Tokyo (JP); Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 13/502,957

(22) PCT Filed: Aug. 25, 2010

(86) PCT No.: PCT/JP2010/005214
§ 371 (c)(1),
(2), (4) Date: Apr. 19, 2012

(87) PCT Pub. No.: WO2011/061881
PCT Pub. Date: May 26, 2011

(65) Prior Publication Data
US 2012/0224494 A1    Sep. 6, 2012

(30) Foreign Application Priority Data

Nov. 19, 2009    (JP) .................................. 2009-263681

(51) Int. Cl.
*H04L 12/26* (2006.01)
*H04L 12/46* (2006.01)
(52) U.S. Cl.
CPC ............................. *H04L 12/4641* (2013.01);
*H04L 12/462* (2013.01)
USPC ....................................................... 370/217
(58) Field of Classification Search
CPC ... H04L 12/56; H04L 12/462; H04L 12/4641; H04L 12/5601; H04L 41/06; H04L 43/50; H04L 49/00; H04L 49/351; H04L 49/352; H04L 12/2419; H04L 1/22; H04L 1/0045; H04L 1/203

USPC .............. 370/244, 238.1, 389, 395.1, 395.53, 370/216–220, 241–242

See application file for complete search history.

(56) References Cited

U.S. PATENT DOCUMENTS 5,268,897 A    12/1993  Komine et al.
7,848,225 B2   12/2010  Yang
(Continued)

FOREIGN PATENT DOCUMENTS

CN    101051995    10/2007
CN    101356778    1/2009
(Continued)

OTHER PUBLICATIONS

International Search Report, PCT/JP2010/005214, Oct. 12, 2010.
(Continued)

*Primary Examiner* — Edan Orgad
*Assistant Examiner* — Saumit Shah
(74) *Attorney, Agent, or Firm* — Young & Thompson (57) ABSTRACT

A transmission system includes a transmission device and a reception device connected with each other via two lines. When the transmission device switches a line, used for transmitting VLAN traffic, from a first line to a second line, the transmission device transmits the VLAN traffic to the second line by switching the line after transmitting a post-switching message to the first line. The reception device includes a first buffer which stores the VLAN traffic received from the first line and a second buffer which stores the VLAN traffic received from the second line. When the reception device receives the post-switching message from the first line, the reception device starts reading of the VLAN traffic from the second buffer after reading the entire VLAN traffic stored in the first buffer.

8 Claims, 6 Drawing Sheets

(56) References Cited

U.S. PATENT DOCUMENTS

| | | | |
|---|---|---|---|
| 7,859,994 B2 * | 12/2010 | Sharma et al. | 370/218 |
| 8,305,907 B2 | 11/2012 | Mizutani et al. | |
| 2007/0076736 A1 | 4/2007 | Sharma et al. | |
| 2009/0003313 A1 * | 1/2009 | Busch et al. | 370/352 |
| 2010/0172238 A1 * | 7/2010 | Saltsidis et al. | 370/228 |
| 2011/0096670 A1 * | 4/2011 | Cheng et al. | 370/241.1 |

FOREIGN PATENT DOCUMENTS

| | | |
|---|---|---|
| JP | 04-098941 | 3/1992 |
| JP | 04-176230 | 6/1992 |
| JP | 07-023032 | 1/1995 |
| JP | 10-145374 | 5/1998 |
| JP | 2004-207849 | 7/2004 |

OTHER PUBLICATIONS

Koji Sato, "Standardization status of Ethernet linear protection switching", IEICE Technical Report, Jan. 15, 2009, vol. 108, No. 394, pp. 67 to 70, particularly, p. 68, left column, lines 11 to 28, left column, line 25 to right column, line 8, right column, line 42 to p. 69, left column, line 2, p. 69, left column, line 47 to right column, line 15.

Hideo Tatsuno, "Hitless Patch Protection Switching Techniques for ATM Networks", The Transactions of the Institute of Electronics, Information and Communication Engineers B-1, Jun. 1993, vol. J76-B-I, No. 6, pp. 421 to 430, particularly, p. 422, left column, line 5 to p. 423, right column, line 4, table 1.

Japanese Office Action dated Apr. 9, 2013 in corresponding Japanese Patent Application No. 2011-541789 with partial English translation of Japanese Office Action.

CN Office Action dated Mar. 5, 2014, with English translation; Application No. 201080052102.8.

* cited by examiner

TRANSMISSION SYSTEM, TRANSMISSION METHOD, AND COMMUNICATION DEVICE

TECHNICAL FIELD

The present invention relates to a transmission system in which communication devices are connected via a plurality of lines in order to improve the reliability of communication, and in particular, to a technique of switching lines to be used for communication.

BACKGROUND ART

A 1:1 protection scheme is standardized by ITU-T (International Telecommunication Union) (ITU-T Recommendation G8031). In this scheme, a transmission device and a reception device are connected via two lines in order to improve the reliability of communication, and in the initial state, communication is performed using one of the lines, while at the time of maintenance work or failure, communication is performed using the other line. In particular, in the 1:1 protection standardized by the ITU-T, a line can be switched to another line by the unit of VLAN traffic based on a switching request by a user.

In the 1:1 protection standardized by the ITU-T Recommendation G.8031, the line switching sections of a transmission device and a reception device are synchronized with each other to switch a line. Meanwhile, another scheme is also proposed, in which a reception device regularly receives frames from the both lines, and 1:1 protection is realized by only switching the line of the transmission device side (see Patent Document 1, for example).

It should be noted that in this description, a frame of the Ethernet (registered trademark) is simply called a frame or a packet.

Patent-Document 1: JP 10-145374 A

Figure 6:
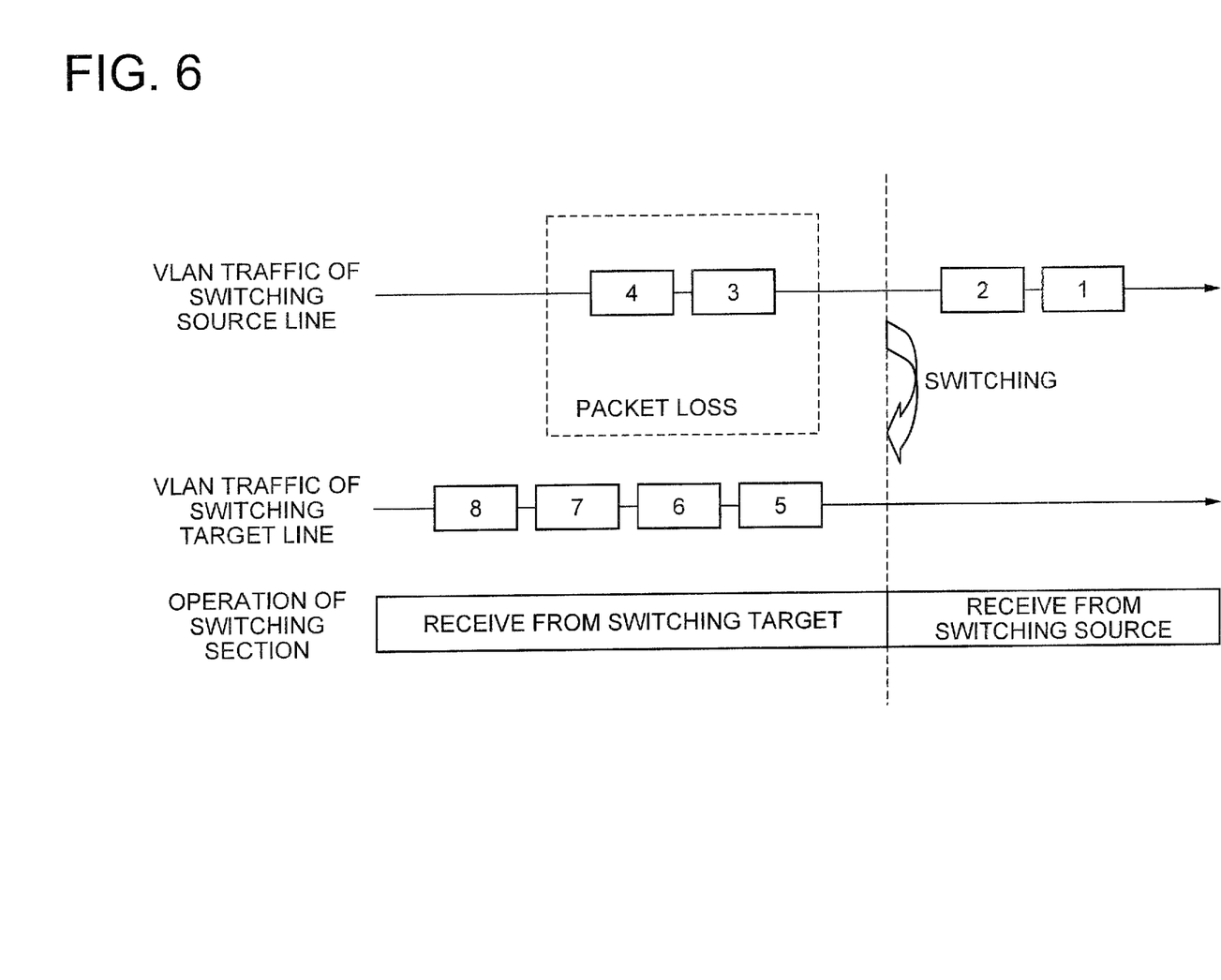
FIG. 6 is an illustration showing a problem to be solved by the present invention.

In the 1:1 protection standardized by the ITU-T, if the switching target line is a high-speed line having a smaller delay quantity compared with that of the switching source line, there is a problem that a packet loss is caused when switching lines. For example, when a transmission device transmits a packet 1, a packet 2, a packet 3, and a packet 4 in this order to the switching source line, and then transmits subsequent packets, namely, a packet 5, a packet 6, a packet 7, and a packet 8, in this order to the switching target line, if the switching target line is a higher-speed line compared with the switching source line, the packets 5 and 6 reach the reception device before the packets 3 and 4 reach the device, as shown in FIG. 6. As such, if line switching is performed immediately after the packet 2 is received from the switching source line, the packets 3 and 4 will be lost. On the contrary, if line switching is performed immediately after the packet 4 is received from the switching source line, the packets 5 and 6 will be lost.

On the other hand, in the scheme described in Patent-Document 1, as the reception device is able to receive not only the packets 1 to 4 but also the packets 5 to 8, a packet loss can be prevented. However, a state where the packets 5 and 6 are received before the packets 3 and 4 may be caused. As such, there is a problem that the sequence of the packets will be changed.

SUMMARY

An object of the present invention is to provide a transmission system, a transmission method, and a communication device capable of solving a problem that in the 1:1 protection, even if there is a delay difference between the two lines, a packet loss or a change in the sequence of packets may be caused.

A transmission system, according to one aspect of the present invention, includes a first communication device and a second communication device connected with each other via a first line and a second line. When the first communication device switches a line, used for transmitting the frames of VLAN traffic, from the first line to the second line, the first communication device starts processing to transmit the frames of the VLAN traffic to the second line by switching the line after transmitting a frame of a post-switching message to the first line. The second communication device includes a first buffer which stores the frames of the VLAN traffic received from the first line, and a second buffer which stores the frames of the VLAN traffic received from the second line, and when the second communication device receives the frame of the post-switching message from the first line, the second communication device starts reading of the frames of the VLAN traffic from the second buffer after reading all of the frames of the VLAN traffic stored in the first buffer.

As the present invention has the configuration as described above, even if there is a delay difference between the first and second lines, it is possible to switch the line without causing a packet loss or a change in the sequence of the packets.

EXEMPLARY EMBODIMENTS

Next, exemplary embodiments of the present invention will be described in detail with reference to the drawings.
First Exemplary Embodiment
Description of Configuration Referring to FIG. 1, a transmission system according to a first exemplary embodiment of the present invention includes a transmission device 11, a reception device 12, and two lines 41 and 42 connecting them.

Figure 1:
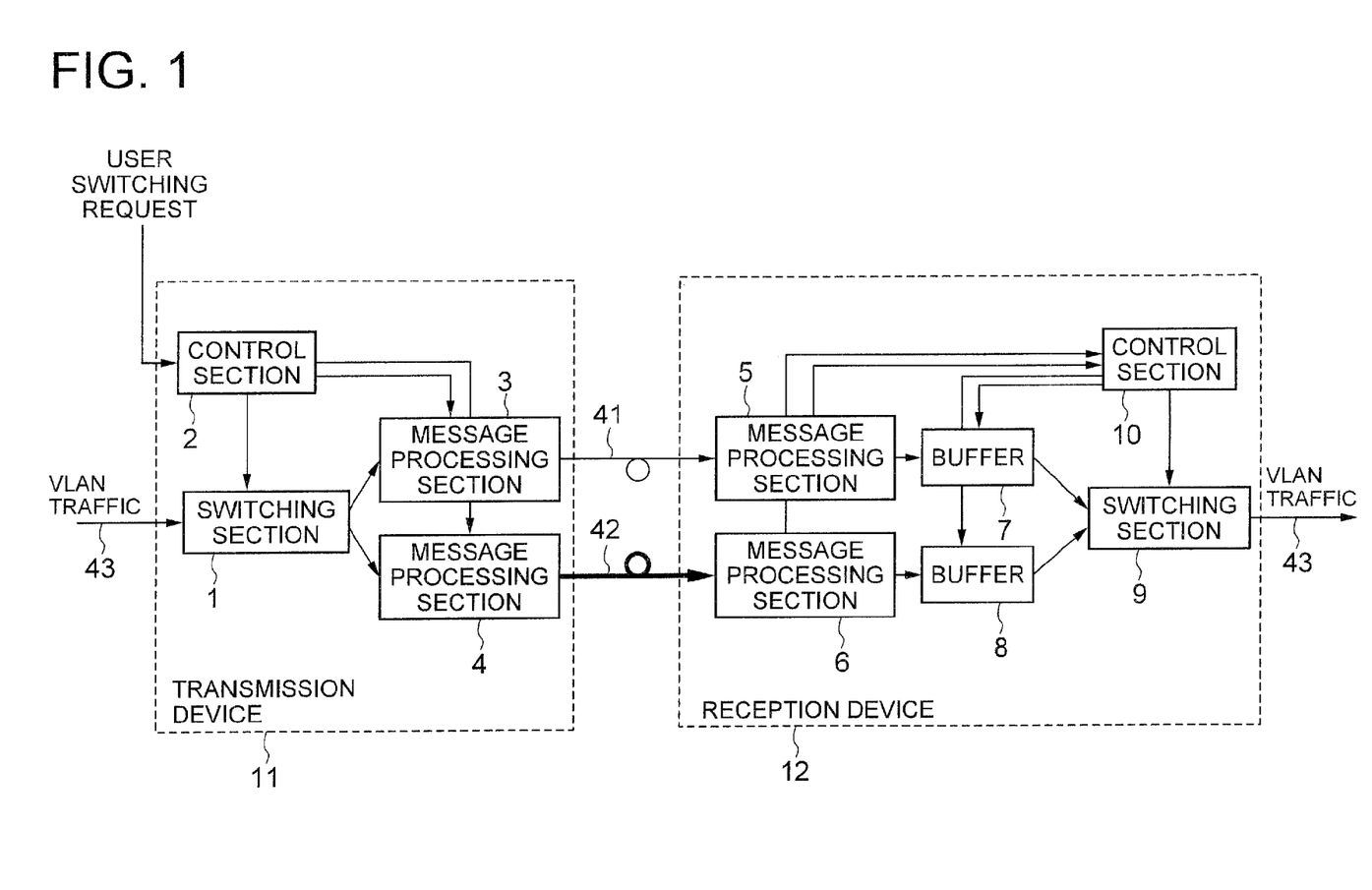
FIG. 1 is a block diagram showing a first exemplary embodiment of the present invention.

Each of the line 41 and the line 42 may be formed of one communication line or one transmission path, or formed of a plurality of communication lines or transmission paths connected via relay devices. Further, in the line 41 and the line 42, a delay time of a packet transmitted from the transmission device 11 until it reaches the reception device 12 may be almost the same or different.

The transmission device 11 transmits VLAN traffic 43, input from the outside, to the reception device 12 using either one of the line 41 and the line 42. The VLAN traffic 43 is a traffic of packets (frames) having the same VLAN ID which is inserted in the header of the Ethernet. The reception device 12 outputs the VLAN traffic 43 received from the line 41 or the line 42 to the outside. In the transmission system of the present embodiment, in the initial state, the VLAN traffic 43 is transmitted and received between the transmission device 11 and the reception device 12 with use of the line 41. When a user switching request specifying that the switching target is the VLAN traffic 43 using the VLAN ID (hereinafter simply referred to as a user switching request) is generated, the line to be used is switched, whereby the VLAN traffic 43 is transmitted and received between the transmission device 11 and the reception device 12 with use of the line 42.

While FIG. 1 only shows the VLAN traffic 43, VLAN traffic other than the VLAN traffic 43 also exists, generally. In the present embodiment, particular VLAN traffic 43 among a plurality of kinds of VLAN traffic is focused on, and description will be given on the configuration and the operation of switching the line, where the traffic flows, from the line 41 to the line 42. By performing the same line switching operation as that performed on the VLAN traffic 43 on the entire existing VLAN traffic, it is possible to switch the entire VLAN traffic flowing on the line 41, to the line 42.

The transmission device 11 includes a switching section 1, a control section 2, and two message processing sections 3 and 4. They have the following functions, respectively.

The switching section 1 transmits the VLAN traffic 43 to the message processing section 3 in the initial state. Further, the switching section 1 switches the transmission direction of the VLAN traffic 43 from the message processing section 3 to the message processing section 4 in accordance with a switching command signal, from the control section 2, specifying that the switching target is the VLAN traffic 43 using the VLAN ID (hereinafter simply referred to as a switching command signal).

The control section 2 transmits, to the message processing section 4, a pre-switching Event message transmission command signal specifying that the switching target is the VLAN traffic 43 using the VLAN ID (hereinafter simply referred to as a pre-switching Event message transmission command signal) in accordance with a user switching request input from the outside, and then transmits a switching command signal to the switching section 1. Upon completion of the switching, the control section 2 transmits, to the message processing section 3, a post-switching Event message transmission command signal specifying that the switching target is the VLAN traffic 43 using the VLAN ID (hereinafter simply referred to as a post-switching Event message transmission command signal).

The message processing section 3 transmits the VLAN traffic from the switching section 1, to the line 41. Further, based on the post-switching Event message transmission command signal from the control section 2, the message processing section 3 generates a post-switching Event message for the VLAN traffic 43 and transmits it to the line 41.

The message processing section 4 transmits the VLAN traffic from the switching section 1, to the line 42. Further, based on the pre-switching Event message transmission command signal from the control section 2, the message processing section 4 generates a pre-switching Event message for the VLAN traffic 43 and transmits it to the line 42.

On the other hand, the reception device 12 includes two message processing sections 5 and 6, two buffers 7 and 8, a switching section 9, and a control section 10. They have the following functions, respectively.

The message processing section 5 separates VLAN traffic and a post-switching Event message from the traffic received via the line 41, transmits the VLAN traffic to the buffer 7, and transmits the post-switching Event message to the control section 10.

The message processing section 6 separates VLAN traffic and a pre-switching Event message from the traffic received via the line 42, transmits the VLAN traffic to the buffer 8, and transmits the pre-switching Event message to the control section 10.

The buffer 7 is a storage device capable of temporarily storing the VLAN traffic from the message processing section 5. The buffer 7 transmits the stored VLAN traffic to the switching section 9 in accordance with a readout request from the switching section 9. The VLAN traffic which has been read out is deleted from the buffer 7.

The buffer 8 is a storage device capable of temporarily storing the VLAN traffic from the message processing section 6. The buffer 8 transmits VLAN traffic to the switching section 9 in accordance with a readout request from the switching section 9. The VLAN traffic which has been read out is deleted from the buffer 8.

The switching section 9 reads the VLAN traffic 43 from the buffer 7 and transmits it to the outside in the initial state. The switching section 9 switches the source, from which the VLAN traffic 43 is read, from the buffer 7 to the buffer 8, in accordance with a switching command signal from the control section 10.

The control section 10 instructs the buffer 8 to start buffering of the VLAN traffic 43 in accordance with a pre-switching Event message from the message processing section 6. Further, the control section 10 transmits a switching command signal to the switching section 9 in accordance with a post-switching Event message from the message processing section 5. In the buffer 8, the VLAN traffic 43 having reached before the switching is stored, and the switching section 9 sequentially reads and transmits it to the outside. It should be noted that the buffer 8 may be configured to regularly buffer the entire VLAN traffic received by the message processing section 6. In that case, a pre-switching Event message may be omitted.

In FIG. 1, the switching section 1 and the switching section 9 are able to be realized by blocks of switching sections in the 1:1 scheme of the Ethernet linear protection (ITU-T Recommendation G8031). The control section 2, the message processing section 3, the message processing section 4, the control section 10, the message processing section 5, and the message processing section 6 are able to be realized by adding new functions based on the similar function blocks in the 1:1 scheme of the Ethernet linear protection (ITU-T Recommendation G8031). Further, the pre-switching Event message and the post-switching Event message generated by the message processing section 3 and the message processing section 4 are able to be realized by the VSM (Vendor-Specific OAM Message) defined by the Ethernet OAM (ITU-T Recommendation Y.1731). The VSM used in the pre-switching Event message and the VSM used in the post-switching Event message are able to be distinguished by, for example, the values set in the operation codes (OpCode) in the Ethernet OAM frames. Further, in the VLAN tag of the Ethernet OAM frame, the same VLAN ID as that of the VLAN traffic of the switching target is set.

Description of Operation

Figure 2:
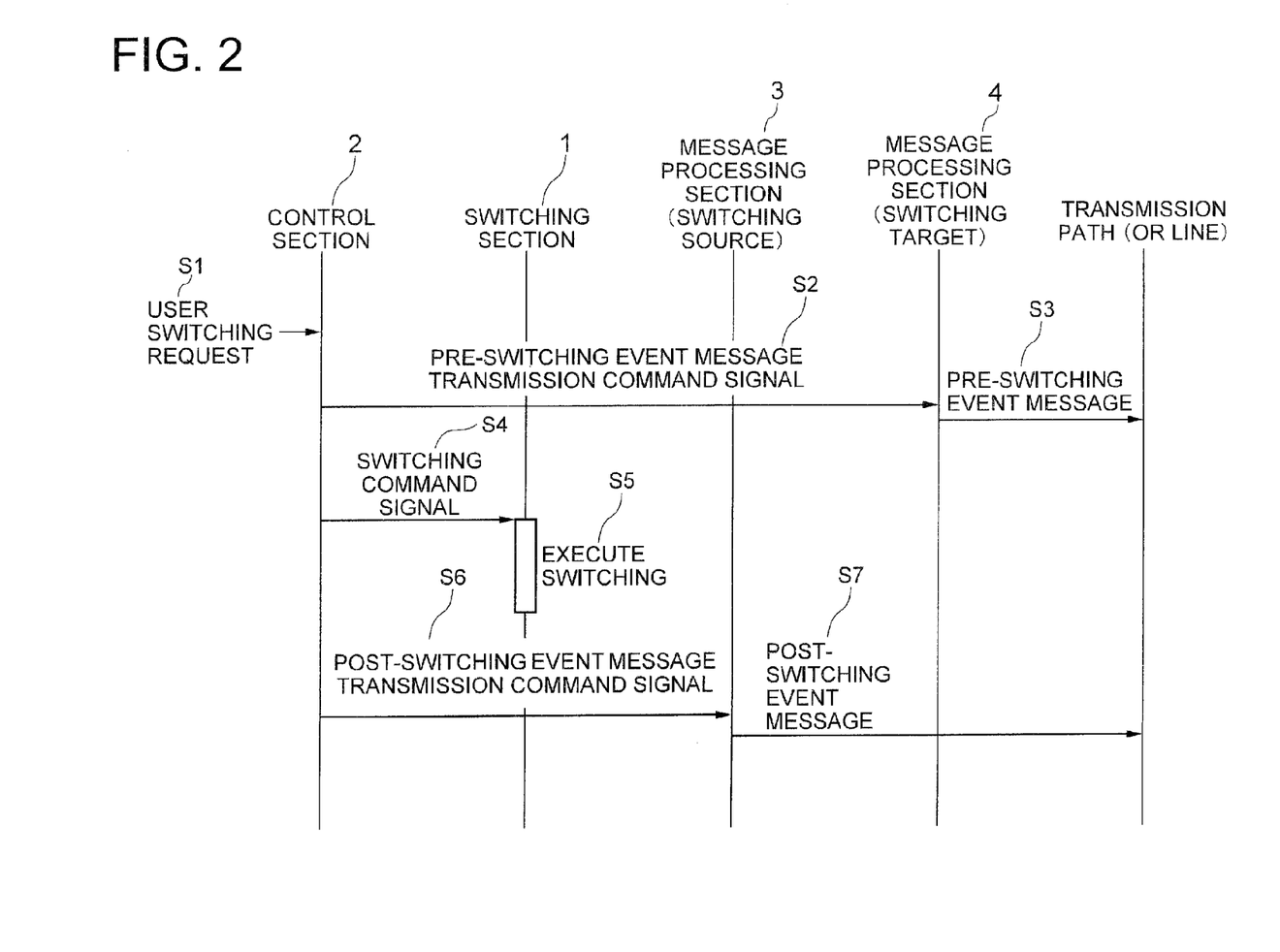
FIG. 2 is an operation sequence chart of a transmission device in the first exemplary embodiment of the present invention.
Figure 3:
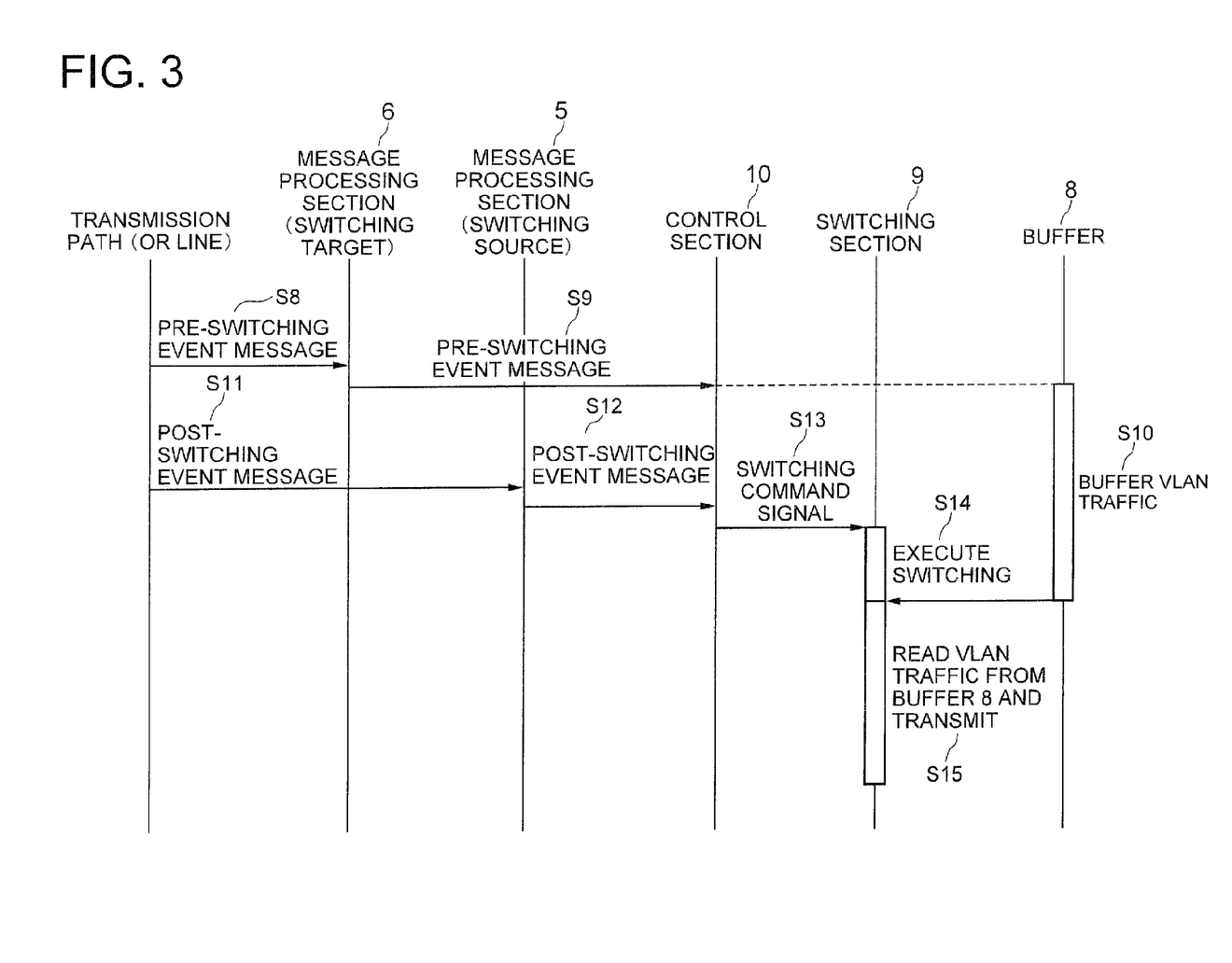
FIG. 3 is an operation sequence chart of a reception device in the first exemplary embodiment of the present invention.

Next, operation of the first exemplary embodiment will be described with reference to the sequence charts shown in FIGS. 2 and 3.

In the initial state, the switching section 1 transmits the VLAN traffic 43 in the direction of the message processing section 3, and the switching section 9 reads the VLAN traffic 43 from the buffer 7.

First, operation of the transmission device 11 shown in FIG. 1 will be described with reference to the sequence chart shown in FIG. 2.

When a line switching request from a user is provided to the control section 2 (step S1 in FIG. 2), the control section 2 transmits a pre-switching Event message transmission command signal to the message processing section 4 (step S2). The message processing section 4 transmits a pre-switching Event message to the line 42 in accordance with the pre-switching Event message transmission command signal from the control section 2 (step S3). Then, the control section 2 outputs a switching command signal to the switching section 1 (step S4). The switching section 1 performs switching of the line used for the VLAN traffic 43 in accordance with the switching command signal from the control section 2 (step S5). As such, the switching section 1 changes the operation of outputting the VLAN traffic 43 to the message processing section 3 to the operation of outputting it to the message processing section 4. Thereby, after the pre-switching Event message, packets of the VLAN traffic 43 flow into the line 42.

Upon completion of the switching, the control section 2 transmits a post-switching Event message transmission command signal to the message processing section 3 (step S6). The message processing section 3 transmits a post-switching Event message to the line 41 in accordance with the post-switching Event message transmission command signal from the control section 2 (step S7). Thereby, after the packets of the VLAN traffic 43 which have flown before the switching, the post-switching Event message flows into the line 41.

Next, operation of the reception device 12 shown in FIG. 1 will be described with use of the sequence chart shown in FIG. 3.

When the message processing section 6 receives the pre-switching Event message from the line 42 (step S8 in FIG. 3), the message processing section 6 transmits the pre-switching Event message to the control section 10 (step S9). In accordance with an instruction from the control section 10 which received the pre-switching Event message, the buffer 8 starts buffering of the VLAN traffic 43 flowing from the message processing section 6 following the pre-switching Event message (step S10).

When the message processing section 5 receives the post-switching Event message from the line 41 (step S11), the message processing section 5 transmits the post-switching Event message to the control section 10 (step S12)

The control section 10, which received the post-switching Event message from the message processing section 5, transmits a switching command signal to the switching section 9 (step S13). When the switching section 9 receives the switching command signal from the control section 10, the switching section 9 performs switching of the line used for the VLAN traffic 43 (step S14). With this switching, the switching section 9 reads all of the packets of the VLAN traffic 43 from the buffer 7, and transmits them to the outside. Upon completion of the switching, the switching section 9 starts reading of the VLAN traffic 43 stored in the buffer 8, and transmits them to the outside (step S15). The buffer 8 deletes the VLAN traffic 43, which has been read, from the buffer of itself.

Description of Effects

According to the present embodiment, even if the line 42, which is the switching target, is a high-speed line having a fewer delay quantity compared with the line 41 which is the switching source, it is possible to perform line switching by the unit of VLAN traffic without causing a packet loss or a change in the sequence of packets. This advantageous effect will be described below.

For example, it is assumed that after the transmission device 11 transmits, to the line 41, a packet 1, a packet 2, a packet 3, and a packet 4 of the VLAN traffic 43, the transmission device 11 switches the line to the line 42 and transmits subsequent packets, namely, a packet 5, a packet 6, a packet 7, and a packet 8, of the VLAN traffic 43 to the line 42. In this case, the transmission device 11 transmits a pre-switching Event message to the line 42 before transmitting the packet 5, and transmits a post-switching Event message to the line 41 after transmitting the packet 4. As the line 42 has a higher speed than the line 41, even if the packets 5 and 6 reach the reception device 12 earlier than the packets 3 and 4, the post-switching Event message has not reached the reception device 12. As such, the packets 5 and 6 remain stored in the buffer 8. When the packets 3 and 4 reach the reception device 12 later than the packets 5 and 6, the packets 3 and 4 are first stored in the buffer 7. Then, when the reception device 12 receives the post-switching Event message via the line 41, the reception device 12 performs line switching. Thereby, the packets 3 and 4 stored in the buffer 7 are first read and output to the outside, and then the packets 5 and 6 stored in the buffer 8 are read. As a result, the packets 1, 2, 3, 4, 5, 6, 7, 8 are output in this order from the switching section 9 to the outside, whereby a packet loss or a change in the sequence of the packets will not be caused.

Second Exemplary Embodiment

Description of Configuration

Figure 4:
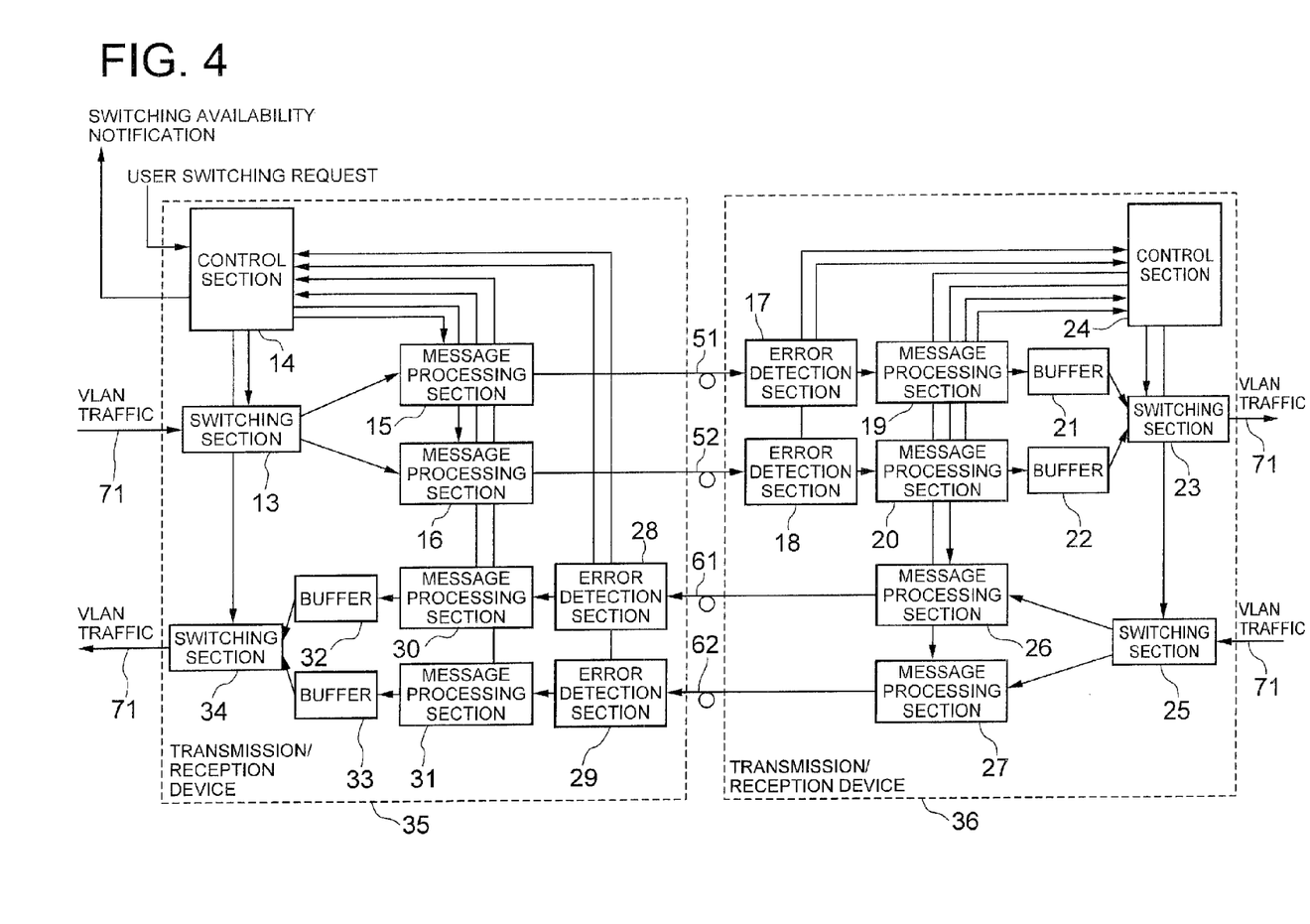
FIG. 4 is a block diagram showing a second exemplary embodiment.

Referring to FIG. 4, a transmission system according to a second exemplary embodiment of the present invention includes transmission/reception devices 35 and 36, and four lines 51, 52, 61, and 62 connecting the devices 35 and 36. It should be noted that the line 51 and line 61 form a pair, and the line 52 and the line 62 form a pair.

Each of the line 51 and the line 52 may be formed of one communication line or one transmission path, or formed of a plurality of communication lines or transmission paths connected via relay devices. Further, in the line 51 and the line 52, a delay time of a packet transmitted from the transmission/reception device 35 until it reaches the transmission/reception device 36 may be almost the same or different.

Each of the line 61 and the line 62 may be formed of one communication line or one transmission path, or formed of a plurality of communication lines or transmission paths connected via relay devices. Further, in the line 61 and the line 62, a delay time of a packet transmitted from the transmission/reception device 36 until it reaches the transmission/reception device 35 may be almost the same or different.

The transmission/reception device 35 transmits VLAN traffic 71, input from the outside, to the transmission/reception device 36 using either one of the line 51 and the line 52. The transmission/reception device 36 outputs the VLAN traffic 71 received from the line 51 or the line 52 to the outside. In the transmission system of the present embodiment, in the initial state, the VLAN traffic 71 is transmitted from the transmission/reception device 35 to the transmission/reception device 36 with use of the line 51. When a user switching request is generated, the line to be used is switched, whereby the VLAN traffic 71 is transmitted from the transmission/reception device 35 to the transmission/reception device 36 with use of the line 52.

Further, the transmission/reception device 36 transmits the VLAN traffic 71, input from the outside, to the transmission/reception device 35 using either one of the line 61 and the line 62. The transmission/reception device 35 outputs the VLAN traffic 71 received from the line 61 or the line 62 to the outside. In the transmission system of the present embodiment, in the initial state, the VLAN traffic 71 is transmitted from the transmission/reception device 36 to the transmission/reception device 35 with use of the line 61. When a user switching request is generated, the line to be used is switched, whereby the VLAN traffic 71 is transmitted from the transmission/reception device 36 to the transmission/reception device 35 with use of the line 62.

While FIG. 4 only shows the VLAN traffic 71, VLAN traffic other than the VLAN traffic 43 also exists, generally. In the present embodiment, particular VLAN traffic 71 among a plurality of kinds of VLAN traffic is focused on, and description will be given on the configuration and the operation of switching the line, where the traffic flows, from the lines 51 and 61 to the lines 52 and 62. By performing the same line switching operation as that performed on the VLAN traffic 71 on the entire existing VLAN traffic, it is possible to switch the entire VLAN traffic, flowing on the lines 51 and 61, to the lines 52 and 62.

The transmission/reception device 35 includes a transmission system device formed of a switching section 13 and message processing sections 15 and 16; a reception system device formed of error detection sections 28 and 29, message processing sections 30 and 31, buffers 32 and 33, and a switching section 34; and a control section 14. The transmission/reception device 36 includes a transmission system device formed of a switching section 25 and message processing sections 26 and 27; a reception system device formed of error detection sections 17 and 18, message processing sections 19 and 20, buffers 21 and 22, and a switching section 23; and a control section 24.

In the initial state, the switching section 13 transmits the VLAN traffic 71 to the message processing section 15, the switching section 23 reads the VLAN traffic 71 from the buffer 21, the switching section 25 transmits the VLAN traffic 71 to the message processing section 26, and the switching section 34 reads the VLAN traffic 71 from the buffer 32.

When the control section 14 receives a line switching request from a user, the control section 14 transmits a line check message transmission command signal to the message processing section 16 in order to inquire of the states of the lines 52 and 62 of the switching target prior to switching. The message processing section 16 generates a line check message in accordance with the line check message transmission command signal from the control section 14, and transmits it by mixing it with the VLAN traffic. The line state check message can be realized by VSM (Vendor-Specific OAM Message) defined by the Ethernet OAM (ITU-T Recommendation Y.1731)

The error detection section 18 transmits the received traffic to the message processing section 20, and if there is any failure in the line, transmits a line error signal to the control section 24. The control section 24 stores the received line error signal. It should be noted that any method can be used to check whether there is any failure in the line. For example, a method of transmitting and receiving CCM (continuity check message) defined by the Ethernet OAM (ITU-T Recommendation Y.1731) between the transmission/reception device 35 and the transmission/reception device 36 via the line 52 at scheduled time intervals, may be used. In that case, if a CCM is not received via the line 52 after a predetermined time has been elapsed, the error detection section 18 is able to determine that a failure has occurred in the line 52. The message processing section 20 separates the VLAN traffic and the line check message from the traffic received from the error detection section 18, transmits the VLAN traffic to the buffer 22, and transmits the line check message to the control section 24. When the control section 24 receives the line check message from the message processing section 20, the control section 24 transmits a line state message transmission command signal to the message processing section 27, in accordance with the line error signal from the error detection section 18. This means that the control section 24 transmits, to the message processing section 27, a signal for transmitting a line state message indicating presence or absence of a failure in the line 52. The message processing section 27 generates a line state message indicating presence or absence of a failure in the line 52 in accordance with the line state message transmission command signal from the control section 24, and transmits it, by mixing it with the VLAN traffic, to the line 62.

The error detection section 29 transmits the received traffic to the message processing section 31, and if there is any failure in the line 62, transmits a line error signal to the control section 14. Detection of presence or absence of a failure in the line 62 can also be performed using CCM (Continuity Check Message), as the case of the line 52. The message processing section 31 separates the VLAN traffic and the line state message from the traffic from the error detection section 29, transmits the VLAN traffic to the buffer 33, and transmits the line state message to the control section 14. Further, the control section 14 receives the line state message from the message processing section 31, and receives, from the error detection section 29, a detection result of presence or absence of a failure in the line 62. The control section 14 checks presence or absence of a failure in the line 52, from the received line state message. Further, the control section 14 checks presence or absence of a failure in the line 62 according to the detection result received from the error detection section 29. Then, if there is any failure in the state of either the switching target line 52 or 62, the control section 14 provides a notice that line switching is unavailable in response to the user switching request. On the other hand, if there is no failure in the states of the switching target lines 52 and 62, the control section 14 performs control necessary for switching the line. This means that the control section 14 transmits a pre-switching Event message transmission command signal to the message processing section 16, transmits a switching command signal to the switching section 13, and upon completion of the switching by the switching section 13, transmits a post-switching Event message transmission command signal to the message processing section 15. The message processing section 16 generates a pre-switching Event message in accordance with the pre-switching Event message transmission command signal from the control section 14, and transits it, by mixing it with the VLAN traffic, to the line 52. The switching section 13 switches the transmission direction of the VLAN traffic 71 from the message processing section 15 to the message processing section 16 in accordance with the switching command signal from the control section 14. The message processing section 15 generates a post-switching Event message in accordance with the post-switching Event message transmission command signal from the control section 14, and transmits it, by mixing it with the VLAN traffic, to the line 51.

The error detection section 18 transmits the received traffic to the message processing section 20. The message processing section 20 separates the VLAN traffic and the pre-switching Event message from the traffic received from the error detection section 18, transmits the VLAN traffic to the buffer 22, and transmits the pre-switching Event message to the control section 24. The buffer 22 is able to temporarily store the VLAN traffic from the message processing section 20, and in accordance with a readout request from the switching section 23, transmits the VLAN traffic to the switching section 23. The VLAN traffic which has been read out is deleted from the buffer.

The error detection section 17 transmits the received traffic to the message processing section 19. The message processing section 19 separates the VLAN traffic and the pre-switching Event message from the traffic received from the error detection section 17, transmits the VLAN traffic to the buffer 21, and transmits the pre-switching Event message to the control section 24. The buffer 21 is able to temporarily store the VLAN traffic from the message processing section 19, and in accordance with a readout request from the switching section 23, transmits the VLAN traffic to the switching section 23. The VLAN traffic which has been read out is deleted from the buffer.

The control section 24 transmits a switching command signal to the switching section 23 in accordance with the post-switching Event message from the message processing section 19. After the switching section 23 performs switching of the line of the switching section 23 in accordance with the switching command signal from the control section 24 (that is, after reading all packets of the VLAN traffic 71 stored in the buffer 21 and transmitting them to the outside), the switching section 23 starts reading of the VLAN traffic 71 stored in the buffer 22, and transmits it to the outside.

Upon completion of the switching by the switching section 23, the control section 24 transmits a pre-switching Event message transmission command signal to the message processing section 27, transmits a switching command signal to the switching section 25, and upon completion of the switching by the switching section 25, transmits a post-switching Event message transmission command signal to the message processing section 26. The message processing section 27 transmits a pre-switching Event message, by mixing it with the VLAN traffic, to the line 62 in accordance with the pre-switching Event message transmission command signal from the control section 24. The switching section 25 switches the transmitting direction of the VLAN traffic 71 from the message processing section 26 to the message processing section 27 in accordance with the switching command signal from the control section 24. The message processing section 26 generates a post-switching Event message in accordance with the post-switching Event message transmission command signal from the control section 24, and transmits it, by mixing it with the VLAN traffic, to the line 61.

The error detection section 29 transmits the received traffic to the message processing section 31. The message processing section 31 separates the VLAN traffic and the pre-switching Event message from the traffic received from the error detection section 29, transmits the VLAN traffic to the buffer 33, and transmits the pre-switching Event message to the control section 14. The buffer 33 is able to temporarily store the VLAN traffic from the message processing section 31, and transmits the VLAN traffic to the switching section 34 in accordance with a readout request from the switching section 34. The VLAN traffic which has been read out is deleted from the buffer.

The error detection section 28 transmits the received traffic to the message processing section 30. The message processing section 30 separates the VLAN traffic and the post-switching Event message from the traffic received from the error detection section 28, transmits the VLAN traffic to the buffer 32, and transmits the post-switching Event message to the control section 14. The buffer 32 is able to temporarily store the VLAN traffic from the message processing section 30, and transmits the VLAN traffic to the switching section 34 in accordance with a readout request from the switching section 34. The VLAN traffic which has been read out is deleted from the buffer.

The control section 14 transmits a switching command signal to the switching section 34 in accordance with the post-switching Event message from the message processing section 28. After the switching section 34 performs switching of the line of the switching section 34 (that is, after reading all packets of the VLAN traffic 71 stored in the buffer 32 and transmitting them to the outside), the switching section 34 reads all packets of the VLAN traffic 71 stored in the buffer 33 and transmits them to the outside.

As described above, as the present embodiment has the configuration of bidirectional communication, a line state of the switching target can be checked through the steps of transmitting a line check message, detecting the line state, and receiving a line state message. This provides an advantageous effect that a switching availability can be notified to a user before performing switching. The present embodiment also provides another advantageous effect that it is not necessary to perform line switching in two directions separately.

Third Exemplary Embodiment

Figure 5:
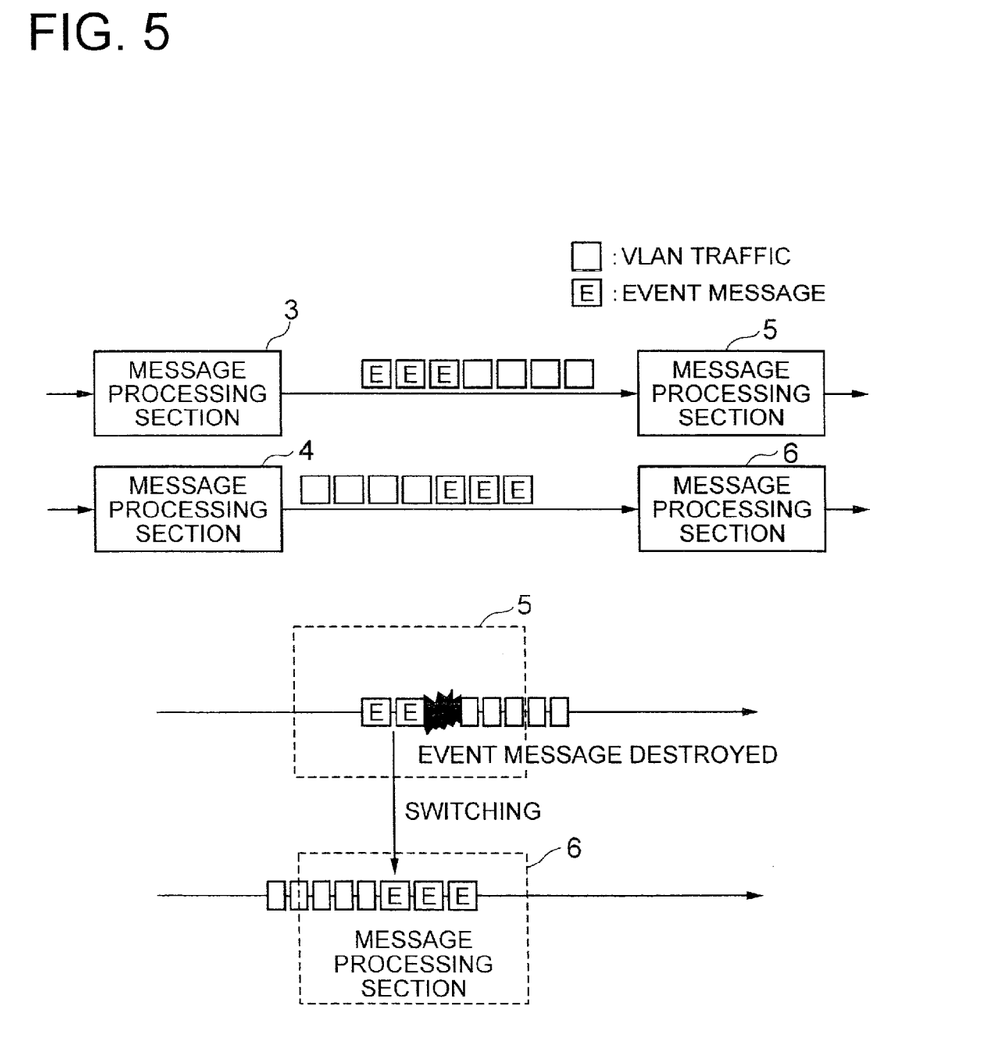
FIG. 5 is a block diagram showing the main parts of another exemplary embodiment of the present invention.

In a third exemplary embodiment of the present invention, while the basic configuration is the same as that of the first or second exemplary embodiment, another effort is made to an Event message. FIG. 5 shows the configuration of the third exemplary embodiment. In FIG. 5, the message processing section makes copies of a post-switching Event message when transmitting the post-switching Event message, and transmits a plurality of copies of the post-switching Event message continuously.

In this way, as the post-switching Event message is transmitted multiple times in the present embodiment, even if any copy of the post-switching Event message is destroyed for some reasons, the present embodiment can achieve an advantageous effect that the line switching processing can be operated normally as long as at least one copy of the post-switching Event message is normal.

While description has been given on the post-switching Event message in the above, it is also possible to transmit a plurality of copies of a pre-switching Event message continuously in a similar manner.

Other Exemplary Embodiments

While description has been given on the exemplary embodiments in which the present invention is applied to 1:1 protection, the present invention is also applicable to a communication device implementing both 1:1 protection and 1+1 protection. In that case, by using a pre-switching message as an instruction to start buffering of a switching target line in the 1+1 protection, it is possible to prevent generation of frame overlap when switching a line in the 1+1 protection.

While the present invention has been described with reference to the exemplary embodiments described above, the present invention is not limited to these embodiments. It will be understood by those skilled in the art that various changes in form and details may be made therein within the scope of the present invention.

This application is based upon and claims the benefit of priority from Japanese patent application No. 2009-263681, filed on Nov. 19, 2009, the disclosure of which is incorporated herein in its entirety by reference.

Industrial Applicability

The present invention is applicable to switching to a backup line at the time of maintenance, manual dispersion of VLAN traffic, switching between lines having a large delay difference, for example.

Reference Numerals 1 switching section
2 control section
3 message processing section 4 message processing section
5 message processing section
6 message processing section
7 buffer
8 buffer
9 switching section
10 control section
11 transmission device
12 reception device
13 switching section
14 control section
15 message processing section
16 message processing section
17 error detection section
18 error detection section
19 message processing section
20 message processing section
21 buffer
22 buffer
23 switching section
24 control section
25 switching section
26 message processing section
27 message processing section
28 error detection section
29 error detection section
30 message processing section
31 message processing section
32 buffer
33 buffer
34 switching section
35 transmission/reception device
36 transmission/reception device
41 line
42 line
51 line
52 line
61 line
62 line

The invention claimed is:

1. A transmission system comprising:

a first communication device and a second communication device connected with each other via a first line and a second line, wherein the first communication device transmits a frame of a post-switching message to the first line after switching a line, used for transmitting frames of VLAN traffic, from the first line to the second line, the second communication device includes a first buffer which stores the frames of the VLAN traffic received from the first line and a second buffer which stores the frames of the VLAN traffic received from the second line, and when the second communication device receives the frame of the post-switching message from the first line, the second communication device starts reading of the frames of the VLAN traffic from the second buffer after reading all of the frames of the VLAN traffic stored in the first buffer, the first communication device includes a first switching section, a first message processing section connected with the first line, a second message processing section connected with the second line, and a first control section, when the first control section switches the line, used for transmitting the frames of the VLAN traffic, from the first line to the second line, the first control section outputs a pre-switching message transmission command signal to the second message processing section, and after outputting a switching command signal to the first switching section, upon completion of switching by the first switching section, outputs a post-switching message transmission command signal to the first message processing section, the first switching section outputs the frames of the VLAN traffic to the first message processing section in an initial state, and when receiving the switching command signal, outputs the frames of the VLAN traffic to the second message processing section, the second message processing section outputs, to the second line, the frames of the VLAN traffic input from the first switching section after transmitting the frame of the pre-switching message to the second line based on the pre-switching message transmission command, and the first message processing section outputs, to the first line, the frames of the VLAN traffic input from the first switching section, and transmits the frame of the post-switching message to the first line based on the post-switching message transmission command.

2. The transmission system according to claim 1, wherein the second communication device includes a third message processing section connected with the first line, a fourth message processing section connected with the second line, a second switching section, and a second control section, when the third message processing section receives the frame of the VLAN traffic from the first line, the third message processing section outputs the frame to the first buffer, while when receiving the frame of the post-switching message from the first line, the third message processing section outputs the frame to the second control section, when the fourth message processing section receives the frame of the VLAN traffic from the second line, the fourth message processing section outputs the frame to the second buffer, while when receiving the frame of the pre-switching message from the second line, the fourth message processing section outputs the frame to the second control section, when the second control section receives the pre-switching message, the second control section notifies the second buffer of starting buffering of the VLAN traffic, while when receiving the post-switching message, the second control section outputs a switching command signal to the second switching section, and the second switching section reads the frames of the VLAN traffic from the first buffer in an initial state, and when receiving the switching command signal, starts reading of the frames of the VLAN traffic from the second buffer after reading all of the frames of the VLAN traffic stored in the first buffer.

3. A transmission system comprising:

a first communication device and a second communication device connected with each other via a first line and a second line, wherein the first communication device transmits a frame of a post-switching message to the first line after switching a line, used for transmitting frames of VLAN traffic, from the first line to the second line, the second communication device includes a first buffer which stores the frames of the VLAN traffic received from the first line and a second buffer which stores the frames of the VLAN traffic received from the second line, and when the second communication device receives the frame of the post-switching message from the first line, the second communication device starts reading of the frames of the VLAN traffic from the second buffer after reading all of the frames of the VLAN traffic stored in the first buffer, the first communication device and the second communication device are further connected via a third line and a fourth line which are used for transmission from the second communication device to the first communication device, the first communication device transmits a frame of a line check message to the second line before switching the line, used for transmitting the frames of the VLAN traffic, from the first line to the second line, when the second communication device receives the line check message via the second line, the second communication device transmits, to the fourth line, a frame of a line state message indicating presence or absence of a failure in the second line, the first communication device determines availability of line switching from the first line to the second line, in accordance with the presence or absence of a failure in the second line indicated by the line check message received via the fourth line, in association with the switching from the first line to the second line, the second communication device transmits a frame of a post-switching message to the third line after switching the line, used for transmitting frames of VLAN traffic, from the third line to the fourth line, the first communication device includes a third buffer which stores the frames of the VLAN traffic received from the third line, and a fourth buffer which stores the frames of the VLAN traffic received from the fourth line, and when receiving the frame of the post-switching message from the third line, the first communication device starts reading of the frames of the VLAN traffic from the fourth buffer after reading all of the frames of the VLAN traffic stored in the third buffer, the first communication device transmits a frame of a pre-switching message to the second line before starting transmission of the frames of the VLAN traffic to the second line, the second communication device transmits a frame of a pre-switching message to the fourth line before starting transmission of the frames of the VLAN traffic to the fourth line, the first communication device includes:
  a first transmission system device including a first switching section, a first message processing section connected with the first line, and a second message processing section connected with the second line;
  a first reception system device including a first error detection section connected with the third line, a second error detection section connected with the fourth line, a third message processing section connected with the first error detection section, a fourth message processing section connected with the second error detection section, the third buffer, the fourth buffer, and a second switching section; and
  a first control section,
the second communication device includes:
  a second reception system device including a third error detection section connected with the first line, a fourth error detection section connected with the second line, a fifth message processing section connected with the third error detection section, a sixth message processing section connected with the fourth error detection section, the first buffer, the second buffer, and a third switching section;
  a second transmission system device including a fourth switching section, a seventh message processing section connected with the third line, and an eighth message processing section connected with the fourth line; and
  a second control section,
wherein the first control section outputs a line check message transmission command signal to the first message processing section before switching the line, used for transmitting the frames of the VLAN traffic, from the first line to the second line, the first message processing section transmits the frame of the line check message to the second line based on the line check message transmission command signal, the fourth error detection section detects presence or absence of a failure in the second line and notifies the second control section of the presence or absence of a failure, the sixth message processing section notifies the second control section of the line check message received from the second line, when the line check message is notified to the second control section, the second control section outputs, to the eighth message processing section, a line state message transmission command including the presence or absence of a failure in the second line notified from the fourth error detection section, the eighth message processing section transmits the frame of the line state message to the fourth line based on the line state message transmission command, the second error detection section detects presence or absence of a failure in the fourth line and notifies the first control section of the presence or absence of a failure, the fourth message processing section notifies the first control section of the line state message received from the fourth line, and the first control section determines availability of line switching from the first line to the second line, based on the presence or absence of a failure in the fourth line notified from the second error detection section and the presence or absence of a failure in the second line indicated by the line state message notified from the fourth message processing section.

4. The transmission system according to claim 3, wherein when the first control section determines to switch the line, used for transmitting the frames of the VLAN traffic, from the first line to the second line, the first control section outputs a pre-switching message transmission command signal to the second message processing section, and after outputting a switching command signal to the first switching section, upon completion of switching by the first switching section, outputs a post-switching message transmission command signal to the first message processing section, the first switching section outputs the frames of the VLAN traffic to the first message processing section in an initial state, and when receiving the switching command signal, outputs the frames of the VLAN traffic to the second message processing section, the second message processing section outputs, to the second line, the frames of the VLAN traffic input from the first switching section after transmitting the frame of the pre-switching message to the second line based on the pre-switching message transmission command, the first message processing section outputs, to the first line, the frames of the VLAN traffic input from the first switching section, and transmits the frame of the post-switching message to the first line based on the post-switching message transmission command, when the fifth message processing section receives the frame of the VLAN traffic from the first line, the fifth message processing section outputs the frame to the first buffer, while when receiving the frame of the post-switching message from the first line, the fifth message processing section outputs the frame to the second control section, when the sixth message processing section receives the frame of the VLAN traffic from the second line, the sixth message processing section outputs the frame to the second buffer, while when receiving the frame of the pre-switching message from the second line, the sixth message processing section outputs the frame to the second control section, the second control section notifies the second buffer of starting buffering of the VLAN traffic when receiving the pre-switching message, while the second control section outputs a switching command signal to the third switching section when receiving the post-switching message, the third switching section reads the frames of the VLAN traffic from the first buffer in the initial state, and when receiving the switching command signal, starts reading of the frames of the VLAN traffic from the second buffer after reading all of the frames of the VLAN traffic stored in the first buffer, the second control section outputs a pre-switching message transmission command signal to the eighth message processing section when switching processing by the third switching section has been completed, and after outputting a switching command signal to the fourth switching section, upon completion of switching by the fourth switching section, outputs a post-switching message transmission command signal to the seventh message processing section, the fourth switching section outputs the frames of the VLAN traffic to the seventh message processing section in the initial state, and when receiving the switching command signal, outputs the frames of the VLAN traffic to the eighth message processing section, the eighth message processing section outputs, to the fourth line, the frames of the VLAN traffic input from the fourth switching section after transmitting the frame of the pre-switching message to the fourth line based on the pre-switching message transmission command, the seventh message processing section outputs, to the third line, the frames of the VLAN traffic input from the fourth switching section, and transmits the frame of the post-switching message to the third line based on the post-switching message transmission command, when the third message processing section receives the frame of the VLAN traffic from the third line, the third message processing section outputs the frame to the third buffer, while when receiving the frame of the post-switching message from the third line, the third message processing section outputs the frame to the first control section, when the fourth message processing section receives the frame of the VLAN traffic from the fourth line, the fourth message processing section outputs the frame to the fourth buffer, while when receiving the frame of the pre-switching message from the fourth line, the fourth message processing section outputs the frame to the first control section, the first control section notifies the fourth buffer of starting buffering of the VLAN traffic when receiving the pre-switching message, while the first control section outputs a switching command signal to the second switching section when receiving the post-switching message, and the second switching section reads the frames of the VLAN traffic from the third buffer in the initial state, and when receiving the switching command signal, starts reading of the frames of the VLAN traffic from the fourth buffer after reading all of the frames of the VLAN traffic stored in the third buffer.

5. A transmission method used in a transmission system including a first communication device and a second communication device connected with each other via a first line and a second line, the method comprising:

by the first communication device, transmitting a frame of a post-switching message to the first line after switching a line, used for transmitting frames of VLAN traffic, from the first line to the second line, the first communication device including a first switching section, a first message processing section connected with the first line, a second message processing section connected with the second line, and a first control section;

by the second communication device including a first buffer which stores the frames of the VLAN traffic received from the first line and a second buffer which stores the frames of the VLAN traffic received from the second line, when receiving the frame of the post-switching message from the first line, starting reading of the frames of the VLAN traffic from the second buffer after reading all of the frames of the VLAN traffic stored in the first buffer;

by the first communication device, before starting transmission of the frames of the VLAN traffic to the second line, transmitting a frame of a pre-switching message to the second line, by the first control section, when switching the line, used for transmitting the frames of the VLAN traffic, from the first line to the second line, outputting a pre-switching message transmission command signal to the second message processing section, and after outputting a switching command signal to the first switching section, upon completion of switching by the first switching section, outputting a post-switching message transmission command signal to the first message processing section;

by the first switching section, outputting the frames of the VLAN traffic to the first message processing section in an initial state, and when receiving the switching command signal, outputting the frames of the VLAN traffic to the second message processing section;

by the second message processing section, after transmitting the frame of the pre-switching message to the second line based on the pre-switching message transmission command, outputting, to the second line, the frames of the VLAN traffic input from the first switching section; and by the first message processing section, outputting, to the first line, the frames of the VLAN traffic input from the first switching section, and transmitting the frame of the post-switching message to the first line based on the post-switching message transmission command.

6. The transmission method according to claim 5, wherein the second communication device includes a third message processing section connected with the first line, a fourth message processing section connected with the second line, a second switching section, and a second control section, and the method further comprising:
- by the third message processing section, when receiving the frame of the VLAN traffic from the first line, outputting the frame to the first buffer, while when receiving the frame of the post-switching message from the first line, outputting the frame to the second control section;
- by the fourth message processing section, when receiving the frame of the VLAN traffic from the second line, outputting the frame to the second buffer, while when receiving the frame of the pre-switching message from the second line, outputting the frame to the second control section;
- by the second control section, when receiving the pre-switching message, notifying the second buffer of starting buffering of the VLAN traffic, while when receiving the post-switching message, outputting a switching command signal to the second switching section, and
- by the second switching section, reading the frames of the VLAN traffic from the first buffer in an initial state, and when receiving the switching command signal, starting reading of the frames of the VLAN traffic from the second buffer after reading all of the frames of the VLAN traffic stored in the first buffer.

7. A communication device connected with another communication device via a first line and a second line, the communication device comprising:
- a first switching section;
- a first message processing section connected with the first line;
- a second message processing section connected with the second line; and
- a first control section,
- wherein the communication device transmits a frame of a post-switching message to the first line after switching a line, used for transmitting frames of VLAN traffic, from the first line to the second line,
- when the first control section switches the line, used for transmitting the frames of the VLAN traffic, from the first line to the second line, the first control section outputs a pre-switching message transmission command signal to the second message processing section, and after outputting a switching command signal to the first switching section, upon completion of switching by the first switching section, outputs a post-switching message transmission command signal to the first message processing section,
- the first switching section outputs the frames of the VLAN traffic to the first message processing section in an initial state, and when receiving the switching command signal, outputs the frames of the VLAN traffic to the second message processing section,
- the second message processing section outputs, to the second line, the frames of the VLAN traffic input from the first switching section after transmitting the frame of the pre-switching message to the second line based on the pre-switching message transmission command, and
- the first message processing section outputs, to the first line, the frames of the VLAN traffic input from the first switching section, and transmits the frame of the post-switching message to the first line based on the post-switching message transmission command.

8. A communication device connected with another communication device via a first line and a second line, the communication device comprising:
- a first buffer which stores frames of VLAN traffic received from the first line;
- a second buffer which stores frames of the VLAN traffic received from the second line;
- a first message processing section connected with the first line;
- a second message processing section connected with the second line;
- a switching section; and
- a control section,
- wherein when the other communication device receives a frame of a post-switching message from the first line, the communication device starts reading of the frames of the VLAN traffic from the second buffer after reading all of the frames of the VLAN traffic stored in the first buffer,
- when the first message processing section receives the frame of the VLAN traffic from the first line, the first message processing section outputs the frame to the first buffer, while when receiving the frame of the post-switching message from the first line, the first message processing section outputs the frame to the control section,
- when the second message processing section receives the frame of the VLAN traffic from the second line, the second message processing section outputs the frame to the second buffer, while when receiving a frame of a pre-switching message from the second line, the second message processing section outputs the frame to the control section,
- when the control section receives the pre-switching message, the control section notifies the second buffer of starting buffering of the VLAN traffic, while when receiving the post-switching message, the control section outputs a switching command signal to the switching section, and
- the switching section reads the frames of the VLAN traffic from the first buffer in an initial state, and when receiving the switching command signal, starts reading of the frames of the VLAN traffic from the second buffer after reading all of the frames of the VLAN traffic stored in the first buffer.

* * * * *